(12) United States Patent
Hwang et al.

(10) Patent No.: US 11,631,865 B2
(45) Date of Patent: Apr. 18, 2023

(54) TRANSITION METAL SUPPORT FOR CATALYST ELECTRODE AND METHOD OF MANUFACTURING SAME

(71) Applicants: Hyundai Motor Company, Seoul (KR); Kia Motors Corporation, Seoul (KR); Korea Advanced Institute of Science and Technology, Daejeon (KR)

(72) Inventors: Jee Youn Hwang, Seoul (KR); Eun Jik Lee, Gyeonggi-do (KR); Ji Hoon Jang, Gyeonggi-do (KR); Song I Oh, Gyeonggi-do (KR); Jin Woo Lee, Daejeon (KR); Sol Youk, Daejeon (KR); Dong Yoon Woo, Daejeon (KR)

(73) Assignees: Hyundai Motor Company, Seoul (KR); Kia Motors Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 453 days.

(21) Appl. No.: 16/702,243

(22) Filed: Dec. 3, 2019

(65) Prior Publication Data

US 2021/0050602 A1     Feb. 18, 2021

(30) Foreign Application Priority Data

Aug. 13, 2019   (KR) .......................... 10-2019-0098581

(51) Int. Cl.
*B01J 21/06*       (2006.01)
*B01J 23/30*       (2006.01)
(Continued)

(52) U.S. Cl.
CPC ........... *H01M 4/925* (2013.01); *B01J 21/063* (2013.01); *B01J 23/30* (2013.01); *B01J 23/42* (2013.01);
(Continued)

(58) Field of Classification Search
CPC . B01J 21/063; B01J 23/30; B01J 23/42; B01J 23/6562; B01J 27/24; B01J 37/082;
(Continued)

(56) References Cited

U.S. PATENT DOCUMENTS

| 5,314,760 | A  | * | 5/1994 | Tsou ........................ | B01J 31/06 |
| | | | | | 427/126.6 |
| 7,534,739 | B2 | * | 5/2009 | Hilgendorff ........ | H01M 4/9008 |
| | | | | | 502/200 |

(Continued)

FOREIGN PATENT DOCUMENTS

KR           20130122290 A      11/2013

*Primary Examiner* — Cam N. Nguyen
(74) *Attorney, Agent, or Firm* — Fox Rothschild LLP

(57) ABSTRACT

The present invention relates to a transition metal nitride support, a method of manufacturing the same, a metal catalyst and a platinum-alloy catalyst including the transition metal nitride support, and manufacturing methods thereof. The manufactured transition metal support prevents corrosion of the support and aggregation of the platinum catalyst, thereby exhibiting high oxygen reduction catalytic activity. Also, strong metal-support interaction (SMSI) can be stabilized, thus improving the durability of the catalyst. The transition metal support includes large pores uniformly distributed therein, thereby increasing the amount of the catalyst supported and minimizing mass-transfer resistance in a membrane- electrode assembly, increasing the performance of a polymer electrolyte membrane fuel cell. The metal catalyst includes platinum particles loaded on the transition metal nitride support, thus exhibiting superior durability and activity. The manufactured platinum-alloy catalyst decreases the use of expensive platinum, thus generating economic benefits and improving the inherent oxygen reduction performance.

19 Claims, 14 Drawing Sheets

(51) Int. Cl.
B01J 23/42 (2006.01)
B01J 27/24 (2006.01)
B01J 37/08 (2006.01)
H01M 4/88 (2006.01)
H01M 4/92 (2006.01)
C01G 23/00 (2006.01)
C01G 33/00 (2006.01)
C01G 41/00 (2006.01)
B01J 23/656 (2006.01)

(52) U.S. Cl.
CPC ........... B01J 23/6562 (2013.01); B01J 27/24 (2013.01); B01J 37/082 (2013.01); C01G 23/00 (2013.01); C01G 33/00 (2013.01); C01G 41/00 (2013.01); H01M 4/8803 (2013.01); H01M 4/8882 (2013.01); H01M 4/92 (2013.01); H01M 4/921 (2013.01)

(58) Field of Classification Search
CPC .... H01M 4/8803; H01M 4/8882; H01M 4/92; H01M 4/921; H01M 4/925; C01G 23/00; C01G 33/00; C01G 41/00
See application file for complete search history.

(56) References Cited

U.S. PATENT DOCUMENTS

| | | | | |
|---|---|---|---|---|
| 8,278,011 | B2 * | 10/2012 | Zhu | H01M 4/8605 |
| | | | | 429/525 |
| 8,524,415 | B2 * | 9/2013 | Cai | H01M 4/9075 |
| | | | | 429/488 |
| 8,709,295 | B2 * | 4/2014 | Zelenay | H01M 4/9083 |
| | | | | 502/1 |
| 9,051,198 | B2 * | 6/2015 | Lau | C01G 33/006 |
| 9,373,849 | B2 * | 6/2016 | Miyata | C01B 32/05 |
| 9,379,388 | B2 * | 6/2016 | Calabrese Barton | H01M 4/881 |
| 9,397,348 | B2 * | 7/2016 | Theobald | H01M 4/921 |
| 9,825,308 | B1 * | 11/2017 | Liu | H01M 4/8657 |
| 9,882,222 | B2 * | 1/2018 | Kuttiyiel | H01M 4/923 |
| 11,413,603 | B2 * | 8/2022 | Shuai | B01J 35/0013 |

* cited by examiner

TRANSITION METAL SUPPORT FOR CATALYST ELECTRODE AND METHOD OF MANUFACTURING SAME

CROSS REFERENCE TO RELATED APPLICATION

The present application claims priority based on Korean Patent Application No. 10-2019-0098581, filed on Aug. 13, 2019, the entire content of which is incorporated herein for all purposes by this reference.

TECHNICAL FIELD

The present invention relates to a transition metal nitride support, a method of manufacturing the same, a metal catalyst and a platinum-alloy catalyst including the transition metal nitride support, and manufacturing methods thereof.

BACKGROUND

Due to energy depletion and environmental issues arising from rapid industrialization, the need to develop sustainable alternative energy technologies has been increasing. For example, hydrogen energy source may be advantageous because it does not emit greenhouse gases such as carbon dioxide, unlike carbon-based fuel, is easily stored in various forms, and may currently be usefully and directly applied to fields such as those of industrial materials, automobiles and residential use.

In addition, a fuel cell is a clean energy source that is very efficiently applicable to mobile equipment including vehicles, and the development of technology related thereto is very important. In particular, a polymer electrolyte membrane fuel cell is suitable for use as a power supply source for mobile equipment such as electric vehicles by virtue of the low operating temperature thereof, and research on commercialization thereof has been carried out.

However, a platinum catalyst has been used to improve the slow oxygen reduction at the cathode, however, an increase in the price of the platinum component may be disadvantageous to the commercialization of fuel cells. In fact, according to the annual report on the hydrogen program, fuel cell component prices indicate that for the production of 500,000 MEAs annually, the price of the platinum catalyst accounts for the highest share of fuel cell system components.

Moreover, the platinum catalyst loaded on the existing carbon support causes carbon degradation at the oxygen reduction potential, which decreases durability and dissolution of the platinum catalyst lower, thus reducing the efficiency of the cathode catalyst.

Therefore, it is necessary to develop a support-based catalyst having superior stability and durability under oxygen reduction conditions.

SUMMARY OF THE INVENTION

In one preferred aspect, provided herein is a method of manufacturing a transition metal nitride support, which may easily synthesize an amphiphilic block copolymer to thus generate economic benefits and obviates the use of a toxic reducing agent (e.g., hydrazine) and is thus safe.

In one preferred aspect, provided is a transition metal nitride support containing synthesized nitride, which may be improved in stability and durability of the cathode compared to conventional cases.

In one preferred aspect, provided is a metal catalyst for an oxygen cathode, which may include the transition metal nitride support supported thereon and may have high durability and activity, a platinum-alloy catalyst, which may include the transition metal nitride support loaded thereon and may improve oxygen reduction performance even by the use of platinum in a decreased amount, and manufacturing methods thereof.

The aspects of the present invention are not limited to the foregoing, and will be clearly understood through the following description and to be realized by the means described in the claims and combinations thereof.

In an aspect, provided is a method of manufacturing a transition metal support. The method may include: preparing an amphiphilic block copolymer, preparing a transition metal precursor, manufacturing a admixture including the amphiphilic block copolymer and the transition metal precursor, evaporating the admixture, manufacturing a transition metal oxide by heat-treating the evaporated admixture, treating the transition metal oxide with a nitrogen precursor, and heat-treating the transition metal oxide treated with the nitrogen precursor.

The preparation of the amphiphilic block copolymer may include preparing a methoxy polyethylene oxide (MeO-PEO) macro-initiator and supplying styrene to the MeO-PEO macro-initiator.

The term "transition metal oxide" as used herein refers to a compound having one or more oxygen atoms bound to a transition metal (e.g., Sc, Ti, V, Cr, Mn, Fe, Co, Ni, Cu, Zn, Y, Zr, Nb, Mo, Tc, Ru, Rh, Pd, Ag, Cd, La, Ta, W Jr, Pt, Au, and the like). In certain embodiments, the transition metal oxide may be formed by chemical reactions or physical changes, e.g., heat-treating, from precursors including transition metal elements. For example, the precursors may be heat-treated in an oxygen atmosphere such that the oxygen atoms can be bound, e.g., chemically bonded, to the metal element.

The amphiphilic block copolymer may suitably include poly(ethylene oxide)-b-polystyrene (PEO-b-PS).

The transition metal precursor may suitably include one or more selected from the group consisting of titanium isopropoxide (TTIP), titanium chloride, niobium ethoxide, niobium chloride, and tungsten chloride.

The admixture may be manufactured by mixing the amphiphilic block copolymer and the transition metal precursor, and then adding and stirring an acid solution.

Evaporating the admixture may be performed at a temperature of about 35 to 50° C.

Heat-treating the admixture may be performed in a manner in which the evaporated admixture is treated at a temperature of about 90 to 110° C., the temperature of the admixture is elevated to a temperature of about 440 to 460° C. from a temperature of about 20 to 30° C. at a heating rate of about 1 to 5° C./min in an oxygen atmosphere, and then heat treatment is carried out for about 1 to 3 hr at the elevated temperature.

The nitrogen precursor may suitably include cyanamide, ammonia ($NH_3$) or combinations thereof.

Heat-treating the transition metal oxide treated with the nitrogen precursor may be performed in a manner in which the temperature of the transition metal oxide treated with the nitrogen precursor is elevated to a temperature of about 790 to 810° C. from a temperature of about 25 to 30° C. at a heating rate of 1 to 5° C./min in an inert gas atmosphere and then heat treatment is carried out for about 2 to 4 hr at the elevated temperature.

In an aspect, provided is a transition metal support, which may suitably include one or more selected from the group consisting of titanium nitride (TiN), niobium nitride (NbN), and tungsten nitride (WN).

The transition metal support may suitably include pores having a size of about 30 to 50 nm.

Further, in an aspect, provided is a method of manufacturing a metal catalyst. The method may to include dispersing a transition metal support manufactured as described herein, preparing a metal catalyst solution, manufacturing an admixture by mixing the metal catalyst solution with the dispersed transition metal support, heat-treating the admixture, stirring the heat-treated admixture, and additionally heat-treating the stirred admixture.

The heat-treating may be performed for about 2 to 4 hr in an inert gas atmosphere at a heating rate of about 0.5 to 1.5° C./min from a temperature of about 25 to 30° C. to a temperature of about 150 to 170° C.

The additional heat-treating may be performed for about 0.5 to 1.5 hr in a hydrogen gas atmosphere at a heating rate of about 0.5 to 1.5° C./min from a temperature of about 25 to 30° C. to a temperature of about 190 to 210° C.

The metal catalyst solution may suitably include platinum (Pt).

Also provided is a metal catalyst, which may include a platinum (Pt) catalyst.

In another aspect, provided is a method of manufacturing a platinum-alloy catalyst. The method may include preparing a transition metal support manufactured as described herein, preparing an admixture including the transition metal support, platinum (Pt), and a metal precursor, dispersing the admixture, and heat-treating the dispersed admixture.

The heat-treating may be performed at a temperature of about 240 to 260° C. for about 1 to 3 hr in a hydrogen gas atmosphere.

The metal precursor may suitably include one or more selected from the group consisting of manganese (Mn), iron (Fe), cobalt (Co), nickel (Ni), and copper (Cu).

Further provide is a platinum-alloy catalyst, which may include one or more selected from the group consisting of $PtMn_x$, $PtFe_x$, $PtCo_x$, $PtNi_x$, and $PtCu_x[0.1 \leq X \leq 3]$. Other aspects of the invention are disclosed infra.

According to various exemplary embodiments of the present invention, a method of manufacturing a transition metal support may provide improved synthesizing an amphiphilic block copolymer to generate economic benefits and obviates the use of a toxic reducing agent (hydrazine) and is thus safe.

Also, the transition metal support manufactured according to various exemplary embodiments of the present invention may include synthesized nitride, thereby preventing corrosion of the support and aggregation of the platinum catalyst, thereby exhibiting high oxygen reduction catalytic activity. Moreover, through the introduction of the transition metal support containing synthesized nitride, strong metal-support interaction (SMSI) of catalyst particles may be implemented and stabilized, thus improving the durability of the catalyst. For example, in the transition metal support according to various exemplary embodiments of the present invention, large pores may be uniformly distributed, the amount of the catalyst that is loaded may be increased due to the high surface area, and mass-transfer resistance in the membrane-electrode assembly may be minimized, thereby increasing the performance of a polymer electrolyte membrane fuel cell.

In addition, a metal catalyst manufactured according to various exemplary embodiments of the present invention may suitably include platinum particles which are loaded on the transition metal nitride support, thereby exhibiting superior durability and activity.

In addition, a platinum-alloy catalyst manufactured according to various exemplary embodiments of the present invention may decrease the use of expensive platinum, thereby generating economic benefits and improving the inherent oxygen reduction performance.

The effects of the present invention are not limited to the foregoing, and should be understood to include all effects that can be reasonably anticipated from the following description.

BRIEF DESCRIPTION OF DRAWINGS

FIG. 58 is a magnified SEM image of an exemplary transition metal oxide according to an exemplary embodiment of the present invention on a 50 nm scale;

DETAILED DESCRIPTION

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

It will be understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof.

As used herein, the singular forms "a", "an" and "the" are intended to include the plural forms as well, unless the context clearly indicates otherwise.

Unless otherwise specified, all numbers, values, and/or representations that express the amounts of components, reaction conditions, polymer compositions, and mixtures (admixtures) used herein are to be taken as approximations including various uncertainties affecting the measurements that essentially occur in obtaining these values, among others, and thus should be understood to be modified by the term "about" in all cases. For example, unless specifically stated or obvious from context, as used herein, the team "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Figure 1:
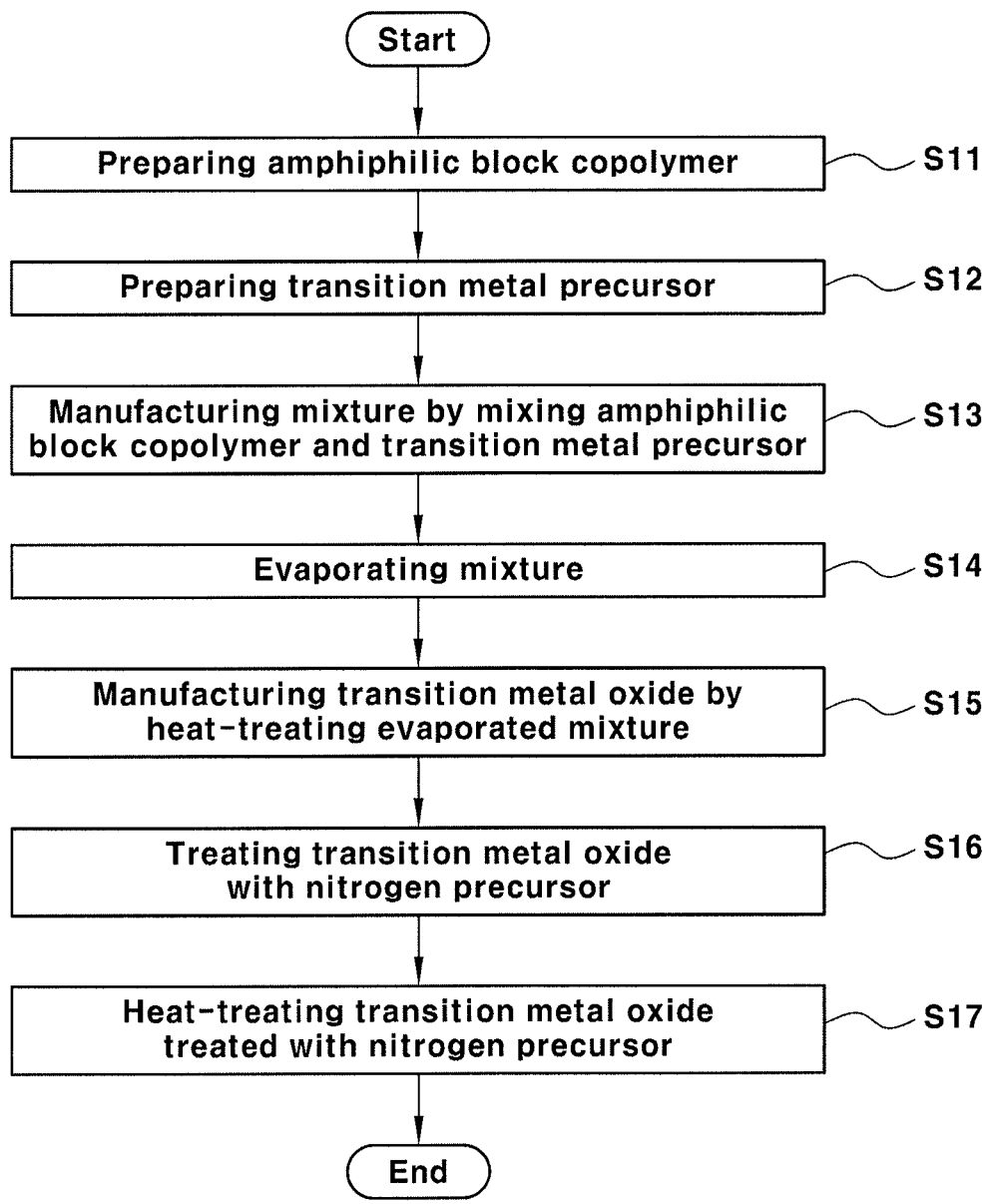
FIG. 1 is a flowchart showing an exemplary process of manufacturing an exemplary transition metal support according to an exemplary embodiment of the present invention.

FIG. 1 is a flowchart showing an exemplary process of manufacturing a transition metal support according to an exemplary embodiment of the present invention. With reference thereto, the method of manufacturing a transition metal support may include preparing an amphiphilic block copolymer (S11), preparing a transition metal precursor (S12), manufacturing an admixture, for example, by mixing the amphiphilic block copolymer and the transition metal precursor (S13), evaporating the admixture (S14), manufacturing a transition metal oxide by heat-treating the evaporated admixture (S15), treating the transition metal oxide with a nitrogen precursor (S16), and heat-treating the transition metal oxide treated with the nitrogen precursor (S17).

In the step of preparing the amphiphilic block copolymer (S11), an amphiphilic block copolymer may be prepared in order to synthesize a transition metal oxide. The amphiphilic block copolymer according to an exemplary embodiment of the present invention is not particularly limited, so long as it has a hydrophilic portion that is able to bind to a transition metal precursor and a hydrophobic portion capable of becoming pores. Preferably, the amphiphilic block copolymer may suitably include, or be, poly(ethylene oxide)-b-polystyrene (PEO-b-PS), which enables evaporation-induced self-assembly.

Preparing the amphiphilic block copolymer PEO-b-PS according to an exemplary embodiment of the present invention may include preparing a methoxy polyethylene oxide (MeO-PEO) macro-initiator and manufacturing an amphiphilic block copolymer, for example, by supplying styrene to the MeO-PEO macro-initiator.

For example, the preparing the MeO-PEO macro-initiator may be performed by adding monomethoxy polyethylene oxide to 2-bromoisobuturyl bromide in the presence of triethylamine and tetrahydrofuran (THF) to thus introduce the end of MeO-PEO with bromine (Br).

Styrene may be supplied to MeO-PEO-Br, which is the MeO-PEO macro-initiator, thereby inexpensively synthesizing an amphiphilic block copolymer, such as PEO-b-PS according to an exemplary embodiment of the present invention.

In the step of preparing the transition metal precursor (S12), a transition metal precursor that enables evaporation-induced self-assembly with the amphiphilic block copolymer may be suitably prepared. The transition metal precursor according to an exemplary embodiment of the present invention may suitably include selected from the group consisting of titanium isopropoxide (TTIP), titanium chloride, niobium ethoxide, niobium chloride, and tungsten chloride. For example, TTIP may be preferably used because it is able to efficiently produce a transition metal oxide through a soft template process using the amphiphilic block copolymer according to the present invention.

In the step of evaporating the admixture (S14), the admixture of the amphiphilic block copolymer and the transition metal precursor prepared in S11 and S12 may be evaporated, and an evaporation-induced self-assembly process, namely a soft template process, maybe performed. For example, the hydrophilic transition metal precursor and the amphiphilic block copolymer may be mixed, and evaporation-induced self-assembly, in which the transition metal precursor selectively may bind to the hydrophilic portion of the amphiphilic block copolymer, may be carried out, thereby obtaining a admixture having a regular pattern.

Thus, the admixture according to an exemplary embodiment of the present invention may evaporate at a temperature of about 35 to 50° C. When the evaporation temperature is less than about 35° C., it is not easy to evaporate the solvent. On the other hand, when the evaporation temperature is greater than about 50° C., the solvent may evaporate quickly, and thus self-assembly of the precursor does not occur properly, making it difficult to attain a desired porous structure.

In the step of manufacturing a transition metal oxide through heat treatment (S15), the admixture having a regular pattern manufactured through the evaporation-induced self-assembly process may suitably be heat-treated, thus manufacturing a transition metal oxide having a nanoporous structure.

When heat-treating the admixture having a regular pattern through evaporation-induced self-assembly, as the final step of the soft template process, the amphiphilic block copolymer decomposes, and thus the hydrophobic portion of the copolymer may include, or become pores and the transition metal precursor may be crystallized to thus constitute pore walls, thereby synthesizing a mesoporous transition metal oxide having a nanoporous structure.

For example, in order to synthesize a transition metal oxide by heat-treating the admixture according to an exemplary embodiment of the present invention, the evaporated admixture may be treated in an oven at a temperature of about 90 to 110° C. for about 24 hr and may then be taken out of the oven.

Next, the temperature of the admixture may be elevated to 4 a temperature of about 40-to 460° C. from a temperature of about 20 to 30° C. at a heating rate of about 1 to 5° C./min in an oxygen atmosphere in a furnace, after which heat treatment may be performed for about 1 to 3 hr at a temperature of about 440 to 460° C., which is the elevated temperature. When the temperature of the admixture falls out of the above range, a porous structure may not be formed properly. Also, when the heating rate and the heat treatment time fall out of the above ranges, oxide crystals may not be formed properly. Also, when the elevated temperature of the admixture is less than about 440° C., a porous structure may not be formed properly. On the other hand, when the elevated temperature of the admixture is greater than about 460° C., transition metal oxide crystals may not be formed properly.

Therefore, the transition metal oxide manufactured through the above heat-treatment process according to an exemplary embodiment of the present invention has a nanoporous structure having a large pore diameter and thus an enlarged surface area, thereby increasing the amount of the catalyst that is supported, and moreover, mass-transfer resistance in the membrane-electrode assembly may be minimized, thereby increasing the performance of a polymer electrolyte membrane fuel cell.

In the steps of treating the transition metal oxide with a nitrogen precursor (S16) and heat-treating the transition metal oxide treated with the nitrogen precursor (S17), the manufactured transition metal oxide may be treated with a nitrogen precursor to afford a transition metal nitride support. For example, the transition metal oxide and the nitrogen precursor according to an exemplary embodiment of the present invention may be ground and then treated. The nitrogen precursor may suitably include cyanamide, ammonia ($NH_3$) and combinations thereof, or particularly, cyanamide that facilitates synthesis with the transition metal oxide. Next, the transition metal oxide treated with the nitrogen precursor may be heat-treated for about 2 to 4 hr in an inert gas atmosphere including argon (Ar) or nitrogen ($N_2$) at a heating rate of about 1 to 5° C./min from room temperature (e.g., 25-30° C.) to a temperature of about 790 to 810° C. When the heating rate, the elevated temperature, and the heat treatment time of the admixture fall out of the above ranges, a transition metal nitride support may not be formed properly.

Consequently, the transition metal support manufactured according to an exemplary embodiment of the present invention may contain synthesized nitride, and may suitably include one or more selected from the group consisting of titanium nitride (TiN), niobium nitride (NbN), and tungsten nitride (WN). Thus, the transition metal support manufactured according to an exemplary embodiment of the present invention may prevent corrosion of the support and aggregation of the platinum catalyst, thus exhibiting superior oxygen reduction catalytic activity. Furthermore, through the introduction of the transition metal nitride support, strong metal-support interaction (SMSI) of catalyst particles may be implemented and stabilized, thereby improving the durability of the catalyst.

Moreover, the transition metal support according to an exemplary embodiment of the present invention may include pores having a size of about 30 to 50 nm. When the pore size is less than about 30 nm, a mass-transfer rate may relatively decrease. On the other hand, when the pore size is greater than about 50 nm, the surface area may decrease and thus a space able to support the catalyst may decrease. Therefore, the transition metal support according to an exemplary embodiment of the present invention may include pores having a large pore diameter that may be uniformly distributed therein, thereby increasing the surface area thereof and increase the amount of the catalyst supported thereon, and also minimizing mass-transfer resistance in the membrane-electrode assembly, ultimately increasing the performance of a polymer electrolyte membrane fuel cell.

Figure 2:
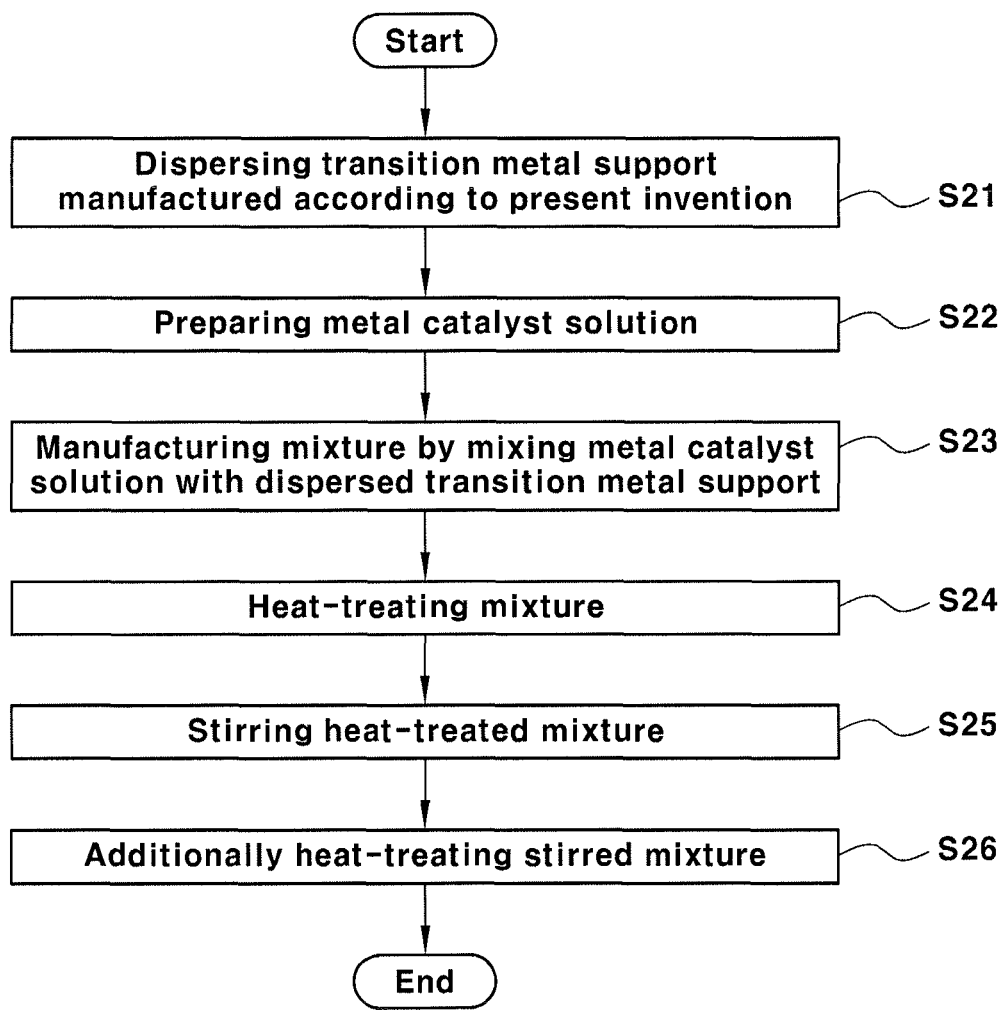
FIG. 2 is a flowchart showing an exemplary process of manufacturing an exemplary metal catalyst according to an exemplary embodiment of the present invention.

FIG. 2 is a flowchart showing the process of manufacturing an exemplary metal catalyst that is loaded on the support according to an exemplary embodiment of the present invention. With reference thereto, the method of manufacturing a metal catalyst may include dispersing a transition metal support manufactured by the above method (S21), preparing a metal catalyst solution (S22), manufacturing a admixture by mixing the metal catalyst solution with the dispersed transition metal support (S23), heat-treating the admixture (S24), stirring the heat-treated admixture (S25) and additionally heat-treating the stirred admixture (S26).

In the steps of dispersing the transition metal support (S21), preparing the metal catalyst solution (S22) and manufacturing the admixture (S23), the transition metal support containing synthesized nitride manufactured according to the present invention is dispersed, after which the dispersed transition metal support is mixed with the metal catalyst solution manufactured according to the present invention, thereby obtaining a admixture.

The transition metal support according to an exemplary embodiment of the present invention may be dispersed by applying ultrasonic energy thereto for about 0.5 to 1.5 hr using an ultrasonic disperser. When the ultrasonic energy is applied for a time less than about 0.5 hr, insufficient dispersion may result. The metal catalyst solution according to an exemplary embodiment of the present invention may be manufactured by dissolving the metal catalyst precursor in an organic solvent and then adding a base thereto until the resulting solution becomes basic. For example, it is preferable to add a base until the pH becomes about 12. Also, the metal catalyst precursor is may suitably include platinum (Pt), which is efficiently used for a cathode catalyst of a polymer electrolyte membrane fuel cell. Next, the dispersed transition metal support and the metal catalyst solution may be mixed with stirring, thus obtaining a admixture for manufacturing a metal catalyst.

In the step of heat-treating the admixture (S24), the admixture for manufacturing a metal catalyst may be heat-treated under an inert gas. For example, the admixture may be heat-treated for about 2 to 4 hr in an inert gas atmosphere including argon (Ar) or nitrogen ($N_2$) at a heating rate of about 0.5 to 1.5° C./min from room temperature (e.g., 25 to 30° C.) to a temperature of about 150 to 170° C. When the heating rate and the heat treatment time fall out of the above ranges, metal catalyst particles may not be formed properly. Also, when the elevated temperature of the admixture falls out of the above range, metal catalyst particle crystals may not be formed to a desired size.

In the steps of stirring the admixture (S25) and additionally heat-treating the stirred admixture (S26), the heat-treated admixture for manufacturing a metal catalyst is stirred, and the stirred admixture is additionally heat-treated under hydrogen gas. For example, the heat-treated admixture may be mixed with an acid and stirred until it becomes acidic. For example, the admixture may be stirred until the pH thereof is less than about 1. Thereafter, the stirred admixture may be heat-treated for about 0.5 to 1.5 hr in a about 10% hydrogen gas atmosphere at a heating rate of about 0.5 to 1.5° C./min from room temperature (e.g., 25 to 30° C.) to a temperature of about 190 to 210° C. When the heating rate, the elevated temperature and the heat treatment time fall out of the above ranges, catalyst particle crystals may not be formed properly.

Figure 4:
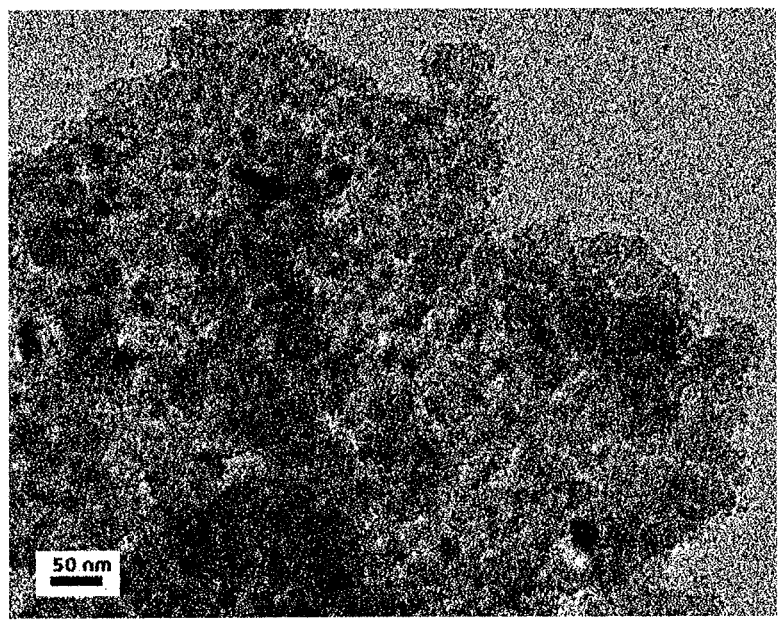
FIG. 4 is a magnified electron microscope image of an exemplary metal catalyst according to an exemplary embodiment of the present invention.

Consequently, the metal catalyst manufactured according to an exemplary embodiment of the present invention suitably include a platinum (Pt) catalyst. For example, the metal catalyst according to an exemplary embodiment of the present invention may include the platinum catalyst that may be loaded on the transition metal support manufactured according to an exemplary embodiment of the present invention, and may include an amount of about 15 to 25 wt % of the platinum catalyst and an amount of about 75 to 85 wt % of the transition metal support based on the total weight of the metal catalyst. When the amount of the platinum catalyst is less than about15 wt %, catalytic activity may decrease. On the other hand, when the amount thereof is greater than about 25 wt %, the reaction rate may increase and thus the production of water, as a byproduct, increases, which may lead to flooding. Meanwhile, the particle size of the platinum catalyst loaded on the transition metal support may range from about 2 to about 3 nm as shown in FIG. 4. When the particle size of the platinum catalyst is less than about 2 nm, the stability of the catalyst may deteriorate. On the other hand, when the particle size thereof is greater than about 3 nm, the area of the catalyst may decrease, undesirably decreasing catalytic activity. Thereby, the metal to catalyst according to an exemplary embodiment of the present invention may be loaded on the transition metal nitride support, thus exhibiting superior interaction between the catalyst and the support, resulting in high durability and catalytic activity.

Figure 3:
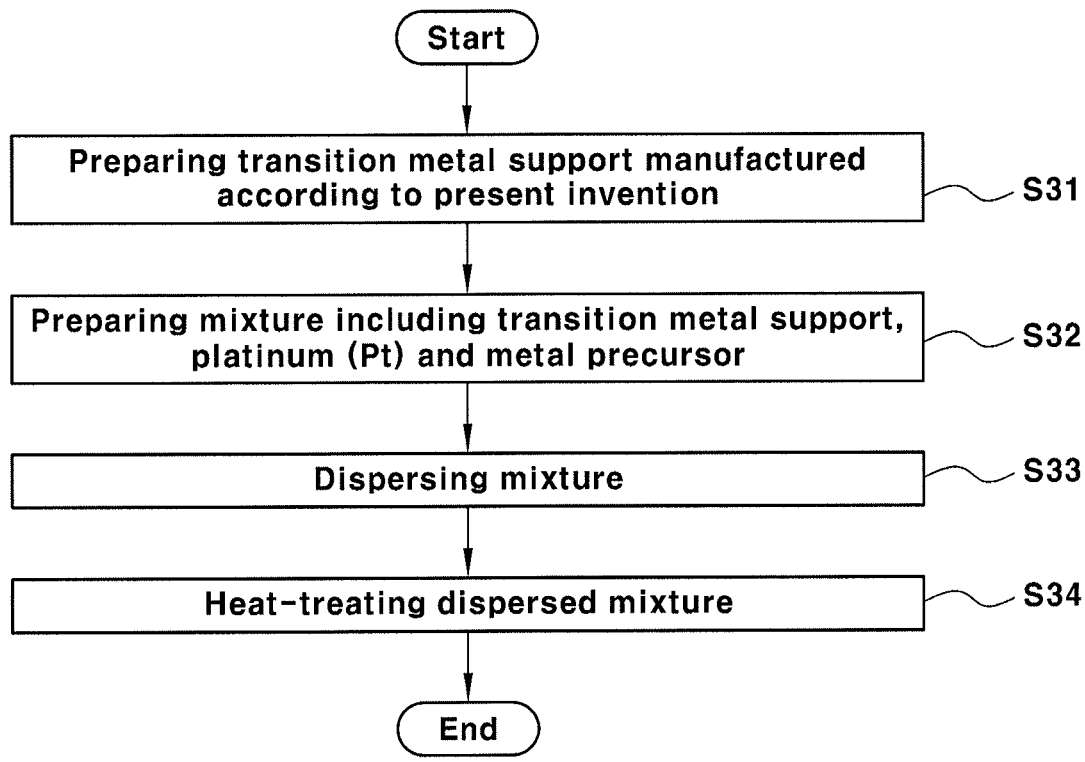
FIG. 3 is a flowchart showing an exemplary process of manufacturing an exemplary platinum-alloy catalyst according to an exemplary embodiment of the present invention.

FIG. 3 is a flowchart showing an exemplary process of manufacturing a platinum-alloy catalyst that is loaded on the support according to an exemplary embodiment of the present invention. With reference thereto, the method of manufacturing a platinum-alloy catalyst may include preparing an admixture including a transition metal support, platinum (Pt) and a metal precursor (S31), dispersing the admixture (S32), and heat-treating the dispersed admixture (S33).

In the steps of preparing the admixture (S31) and dispersing the admixture (S32), the transition metal support containing synthesized nitride manufactured according to an exemplary embodiment of the present invention, platinum and the metal precursor may be mixed, thus obtaining a admixture for manufacturing a platinum-alloy catalyst, after which individual components may be uniformly dispersed. The metal precursor may not be particularly limited, so long as it is able to be alloyed with platinum to thus improve the performance of the cathode, and may include one or more preferably selected from the group consisting of manganese (Mn), iron (Fe), cobalt (Co), nickel (Ni), copper (Cu) and combinations thereof. For example, the transition metal support, platinum and the metal precursor may be mixed, after which ultrasonic energy is applied thereto using an ultrasonic disperser in an inert gas atmosphere including argon (Ar) for 2 to 4 hr, thereby uniformly dispersing the platinum-alloy catalyst. When the ultrasonic energy is applied for a time less than 2 hr, insufficient dispersion may result. Thereafter, the dispersed admixture may be washed using an acid, etc.

In the step of heat-treating the dispersed admixture (S33), the admixture for manufacturing a platinum-alloy catalyst may be dispersed and then heat-treated, thus forming a platinum-alloy catalyst. For example, the admixture may be heat-treated for about 1 to 3 hr at a temperature of about 240 to 260° C. in a 5% hydrogen gas atmosphere. When the heat treatment temperature falls out of the above range, a platinum-alloy catalyst may not be formed.

Consequently, the platinum-alloy catalyst manufactured according to an exemplary embodiment of the present invention may suitably include one or more selected from the group consisting of $PtMn_x$, $PtFe_x$, $PtCo_x$, $PtNi_x$, and $PtCu_x$. Preferably, x may range from about [0.1] to about [3]. For example, the platinum-alloy catalyst according to an exemplary embodiment of the present invention may be loaded on the transition metal support manufactured according to an exemplary embodiment of the present invention, and may include an amount of about 35 to 45 wt % of the platinum-alloy and an amount of about 55 to 65 wt % of the transition metal support, based on the total weight of the platinum-alloy catalyst. When the amount of the platinum-alloy is less than about 35 wt %, catalytic activity may decrease. On the other hand, when the amount thereof is greater than about 45 wt %, water, which is a byproduct of the oxygen reduction reaction, may be generated in a large amount, thus causing flooding problems. Also, when the amount of the transition metal support is less than about 55 wt %, the area on which the catalyst may be supported may decrease and porosity may be reduced. On the other hand, when the amount thereof is greater than about 65 wt %, the relative amount of the catalyst may decrease, undesirably deteriorating catalytic activity. Meanwhile, the particle size of the platinum-alloy catalyst loaded on the transition metal support may suitably range from 2 to 3 nm. When the particle size of the platinum-alloy catalyst is less than about 2 nm, the stability of the catalyst may decrease. On the other hand, when the particle size thereof is greater than about 3 nm, catalytic activity may decrease. In this way, the platinum-alloy catalyst according to an exemplary embodiment of the present invention is loaded on the transition metal nitride support, thus exhibiting strong interaction between the catalyst and the support, resulting in high durability. Moreover, the use of expensive platinum may be decreased, thus generating economic benefits and improving oxygen reduction performance.

EXAMPLE

A better understanding of the present invention will be given through the following examples. These examples are merely set forth to illustrate the present invention but are not to be construed as limiting the scope of the present invention.

Example 1

(S11) In order to manufacture a transition metal support, an amphiphilic block copolymer was prepared. Specifically, 20 g of monomethoxy polyethylene oxide was thoroughly dissolved in toluene, after which the resulting solution was dewatered through azeotropic distillation. Thereafter, the resulting product was dissolved in tetrahydrofuran (THF), sufficiently cooled, and stirred under inert gas including argon or nitrogen while excessive amounts of triethylamine and 2-bromoisobuturyl bromide were added little by little. Thereafter, the salt was filtered off through vacuum filtration and then the solvent was completely removed through rotary evaporation. Thereafter, an appropriate amount of low-temperature ether was added little by little to precipitate the material, and then MeO-PEO-Br, which is a crude macro-initiator, was obtained through vacuum filtration. Thereafter, the MeO-PEO-Br was dissolved in a hydrochloric acid solution and then extracted through a separatory funnel, the solvent was removed through rotary evaporation, and styrene was placed in a reactor containing MeO-PEO-Br and CuBr under inert gas, stirred, and then added with pentamethyldiethylene triamine. Thereafter, oxygen was removed through freeze-drying three times, and the PEO-b-PS reacted and solidified in an oil bath at 110° C. was cooled and then dissolved in THF, after which PEO-b-PS was filtered using an aluminum oxide column, the solvent was removed, and PEO-b-PS was precipitated and filtered, thus preparing PEO-b-PS, which is an amphiphilic block copolymer.

(S12 to S15) 2.7 ml of a TTIP (titanium isopropoxide) solution was added dropwise to THF in which 0.45 g of the synthesized amphiphilic block copolymer PEO-b-PS was dissolved, after which 0.9 ml of a 35% hydrochloric acid solution was mixed and stirred. Thereafter, the stirred admixture was placed in a Petri dish and subjected to evaporation-induced self-assembly at a temperature of 40° C. Thereafter, the resulting product was stored in an oven set at a temperature of 100° C. for 24 hr, the temperature thereof was elevated to a temperature of 450° C. from room temperature (20-30° C.) at a heating rate of 5° C./min in an oxygen gas atmosphere, and heat treatment was carried out for 2 hr at the elevated temperature, thus obtaining a transition metal oxide.

(S16 and S17) 0.25 g of the transition metal oxide thus obtained, 5 g of cyanamide and a small amount of ethanol were ground using a mortar and pestle. Thereafter, the resulting admixture was heat-treated for 3 hr in an inert gas atmosphere including argon (99.999%) at a heating rate of 5° C./min from room temperature (20-30° C.) to 800° C. in a sealed state, thus manufacturing a transition metal support containing synthesized nitride.

Example 2

A metal catalyst was manufactured using the transition metal support (TiN) of Example 1 according to the present invention.

Specifically, 1 g of the transition metal support of Example 1 was added to 43.3 ml of ethylene glycol and then dispersed for 1 hr or more using an ultrasonic disperser. Meanwhile, 0.053 g of a platinum precursor was dissolved in 1.04 ml of ethylene glycol, after which 1 M sodium hydroxide (NaOH) was added little by little until a pH of 12 was reached, thus preparing a platinum-containing metal catalyst solution. Next, the dispersed transition metal support and the platinum-containing metal catalyst solution were stirred and then primarily heat-treated for 3 hr in an inert gas atmosphere including argon (99.999%) at a heating rate of 1° C./min from room temperature (20-30° C.) to a temperature of 160° C. Next, a 10% HCl solution was added dropwise until the pH dropped below 1, followed by stirring. Next, the heat-treated admixture was washed using purified water. Thereafter, secondary heat treatment was performed for 1 hr in a 10% hydrogen gas atmosphere at a heating rate of 1° C./min from room temperature (20-30° C.) to a temperature of 200° C., thereby manufacturing a platinum metal catalyst including 20 wt % of the platinum catalyst and 80 wt % of the transition metal support.

Example 3

A platinum-alloy catalyst was manufactured using the transition metal support of Example 1 according to the present invention.

Specifically, 0.485 g of the transition metal support (TiN) of Example 1, 0.747 g of iron(III) acetylacetonate and 0.823 g of platinum(II) acetylacetonate were added to ethylene glycol and then to uniformly dispersed by applying ultrasonic energy for 3 hr or more using an ultrasonic disperser. Next, the admixture was washed with ethanol, purified water and an acid. Next, heat treatment was performed for 2 hr in a 5% hydrogen gas atmosphere at 250° C., thereby manufacturing a platinum-alloy catalyst $PtFe_x$ including 40 wt % of the platinum-alloy catalyst and 60 wt % of the transition metal support.

Comparative Example 1

A transition metal support was manufactured in the same manner as in Example 1, with the exception that ammonia was used as the nitrogen precursor.

Comparative Example 2

A commercially available platinum catalyst loaded on a commercially available carbon support, including 20 wt % of the platinum catalyst and 80 wt % of the carbon support, was prepared.

Comparative Example 3

A commercially available platinum-alloy catalyst loaded on a commercially available nitride support, including 40 wt % of the platinum-alloy catalyst and 60 wt % of the nitride support, was prepared.

Test Example 1.1

Evaluation of Pore Size of Transition Metal Support Containing Synthesized Nitride The pore size of the transition metal support containing synthesized nitride manufactured in Example 1 of the present invention was evaluated using an electron microscope.

Figure 5A:
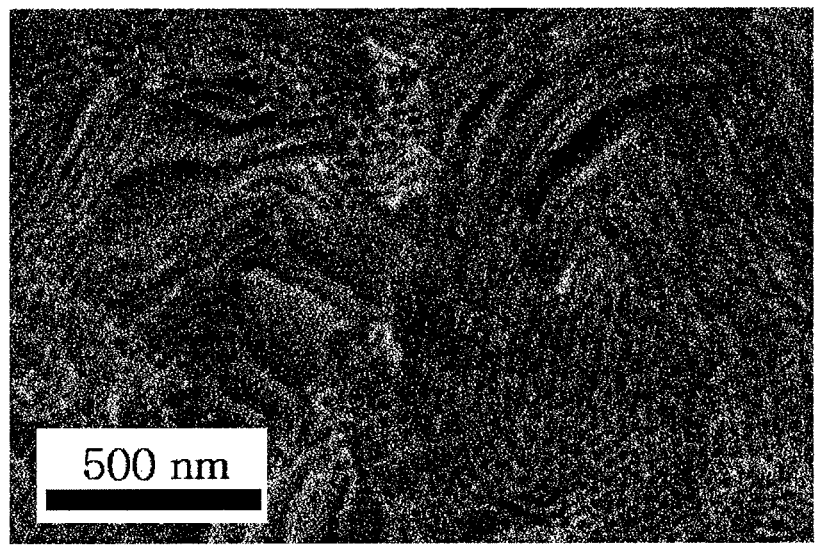
FIG. 5A is a magnified scanning electron microscope (SEM) image of an exemplary transition metal oxide according to an exemplary embodiment of the present invention on a 500 nm scale.
Figure 5B:
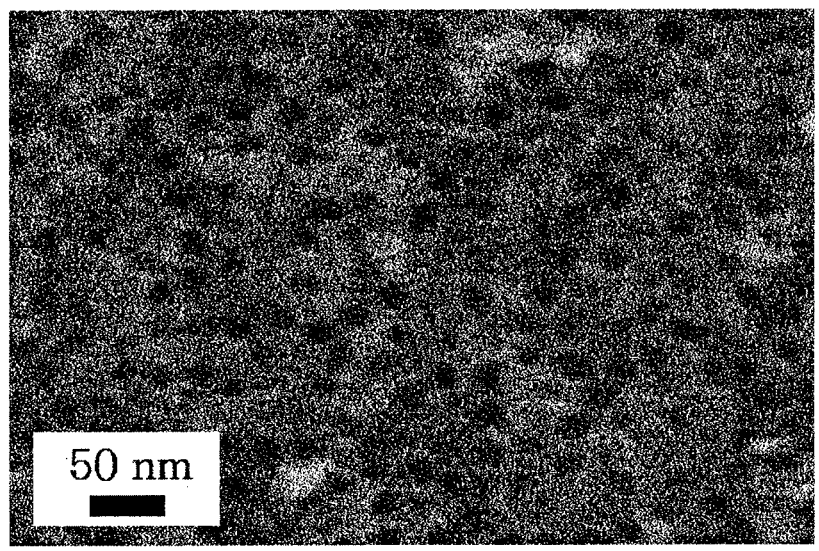
FIG. 5C is a magnified transmission electron microscope (TEM) image of the transition metal oxide according to the present invention on a 100 nm scale.
Figure 5C:
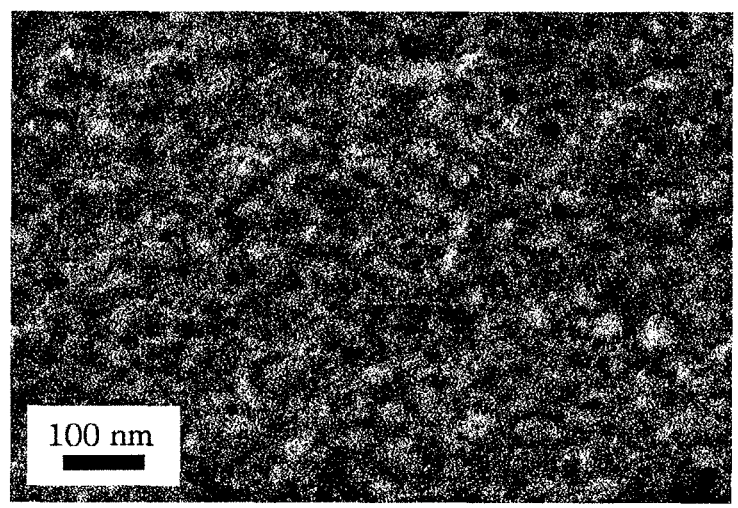

As shown in FIGS. 5A to 5C, electron microscopy confirmed that the transition metal oxide included pores having a size greater than 40 nm therein before the synthesis of nitride on the transition metal support. Also, based on the result of measurement using a BET device, it was confirmed that the BET surface area was 62.89 m²/g and that the BET pore size was greater than 40 nm.

Figure 6A:
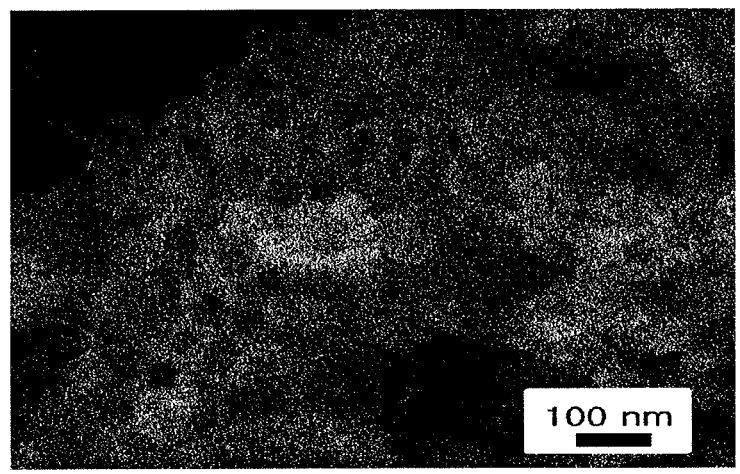
FIG. 6A is a magnified SEM image of an exemplary transition metal support containing an exemplary synthesized nitride according to an exemplary embodiment of the present invention on a 100 nm scale.
Figure 6B:
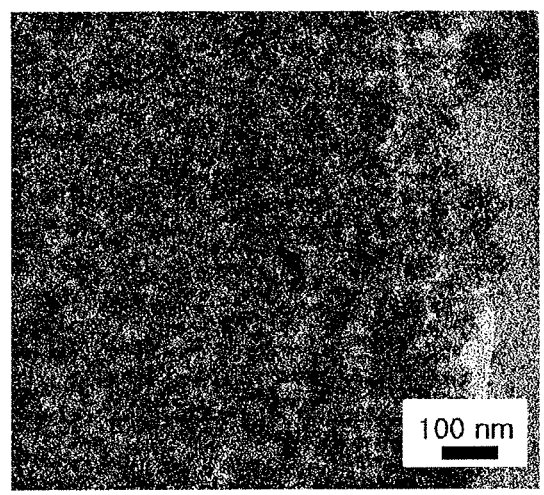
FIG. 6B is a magnified TEM image of an exemplary transition metal support containing an exemplary synthesized nitride according to an exemplary embodiment of the present invention on a 100 nm scale.
Figure 7:
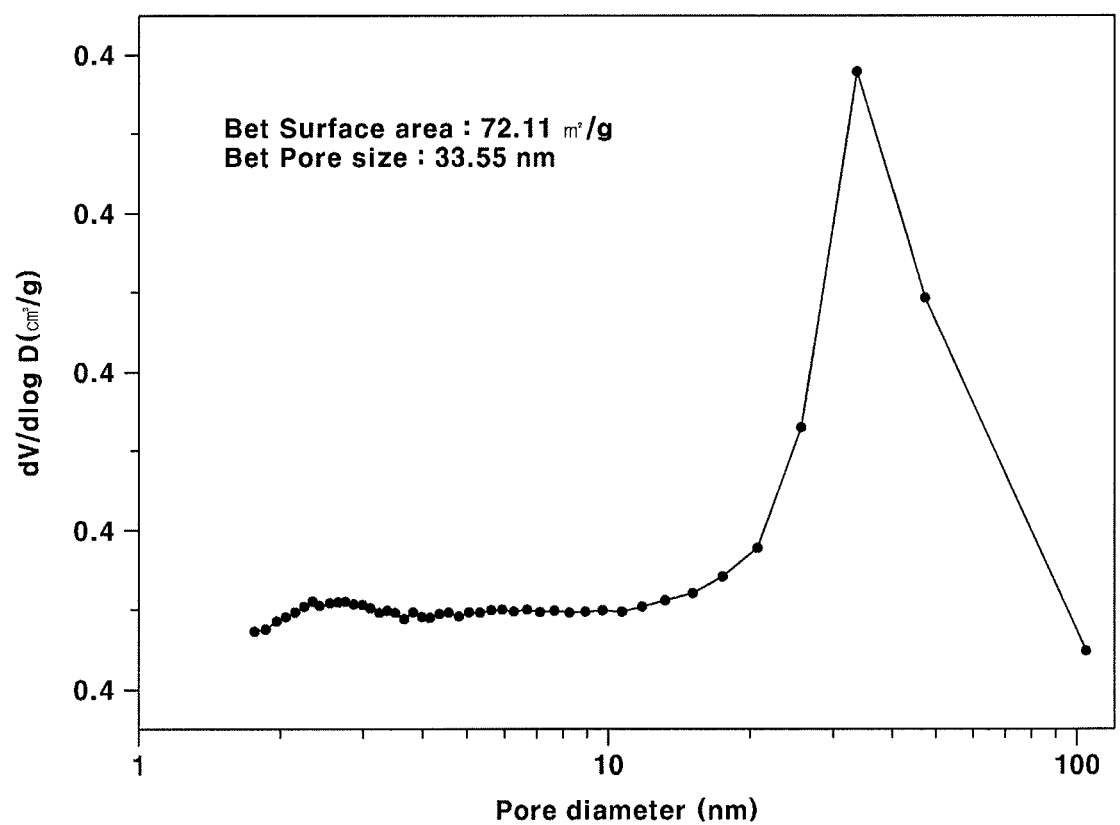
FIG. 7 is a graph showing the size distribution of pores in an exemplary transition metal support containing an exemplary synthesized nitride according to an exemplary embodiment of the present invention.

As shown in FIGS. 6A and 6B, electron microscopy confirmed that the transition metal support containing synthesized nitride included uniformly distributed pores having a size of 30 nm or greater therein. Furthermore, as shown in FIG. 7, in which the pore size distribution is graphed, pores having a BET pore size of about 33.55 nm were most abundantly distributed in the transition metal support, and the BET surface area was 72.11 m²/g.

Therefore, the transition metal support containing synthesized nitride according to an exemplary embodiment of the present invention is configured to include large pores uniformly distributed therein and thus has an enlarged surface area. Due to the high surface area, the amount of the catalyst that is supported can be increased and mass-transfer resistance in the membrane-electrode assembly can be minimized, thereby improving the performance of a polymer electrolyte membrane fuel cell.

Test Example 1.2

Measurement of Nitride Synthesis Density of Transition Metal Support

The extent of synthesis density of the nitride of the transition metal support manufactured in Example 1 of the present invention was compared with that of Comparative Example 1 through XRD analysis.

Figure 8:
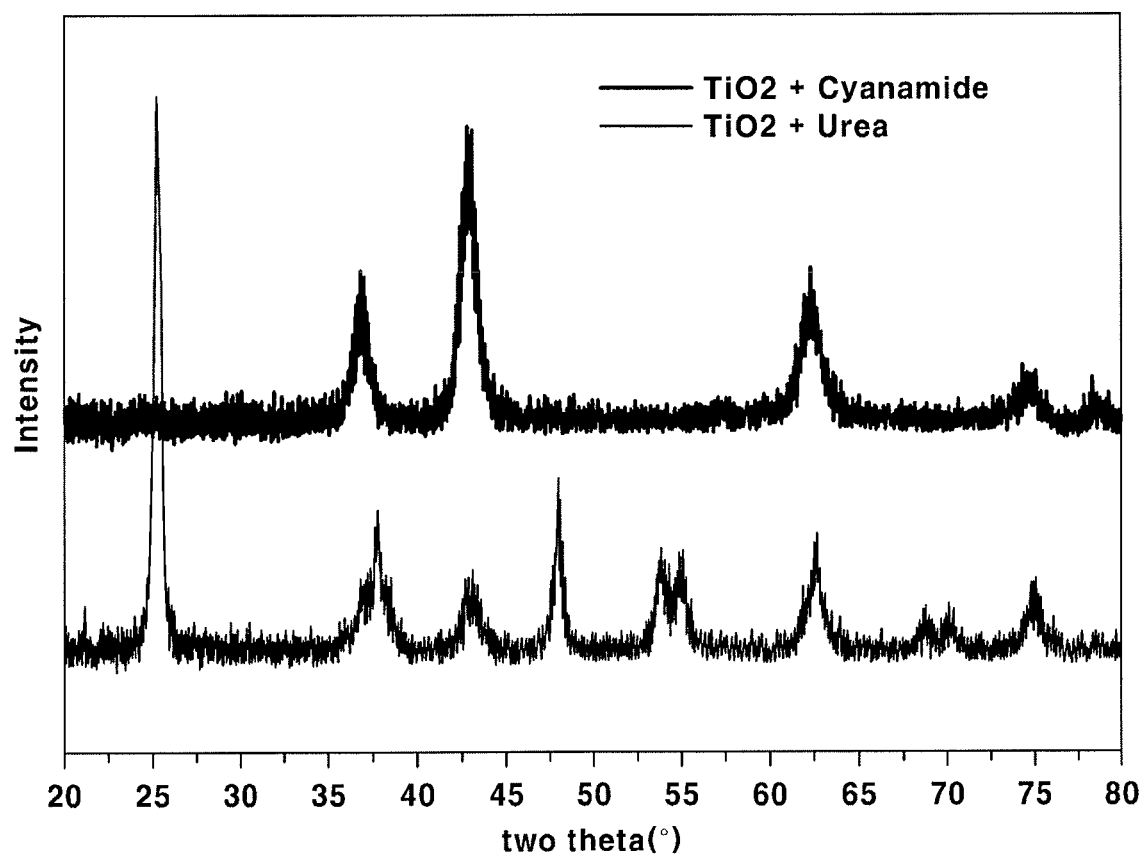
FIG. 8 is a graph showing the X-ray diffraction (XRD) pattern of the synthesis density depending on the kind of nitrogen precursor of the transition metal oxide according to an exemplary embodiment of the present invention.

As shown in FIG. 8, the nitrogen synthesis density was found to be greater in most regions except for a part in the transition metal support (Example 1) synthesized using cyanamide as the nitrogen precursor than in the transition metal support (Comparative Example 1) synthesized using ammonia as the nitrogen precursor.

Therefore, the transition metal support according to an exemplary embodiment of the present invention can exhibit high synthesis density using, as the nitrogen precursor, cyanamide, which is safer than ammonia or hydrazine. Thus, the present invention is capable of manufacturing a transition metal support having excellent safety without using a toxic reducing agent (hydrazine, or the like). Moreover, the transition metal support containing synthesized nitride can prevent corrosion of the support and aggregation of the platinum catalyst, thereby exhibiting high oxygen reduction catalytic activity. Furthermore, through the introduction of the transition metal nitride support, strong metal-support interaction (SMSI) of catalyst particles can be implemented and stabilized, ultimately improving the durability of the catalyst.

Test Example 2.1

Comparison of Electrochemically Active Area of Metal Catalyst

The extent of the decrease in the electrochemically active area of the metal catalyst manufactured in Example 2 of the present invention was compared with that of the commercially available platinum metal catalyst of Comparative Example 2.

Specifically, half-cell analysis was performed in order to compare the decrease in the electrochemically active area before and after the durability test. For specific half-cell analysis, 5 mg of each of the metal catalyst of Example 2 and the commercially available platinum catalyst of Comparative Example 2 was mixed with 0.97 ml of a solvent (isopropyl alcohol:$H_2O$=9:1) and 30 μl of a Nafion solution (5 wt %) and dispersed through sonication for 30 min. Next, the solution was applied in an amount of 10 μl onto a polished glassy carbon electrode (5 mm in diameter) and then dried at room temperature. Next, the electrode was connected to a rotating disk electrode, after which electrochemistry was measured in an oxygen-saturated 0.1 M $HClO_4$ solution.

Figure 9A:
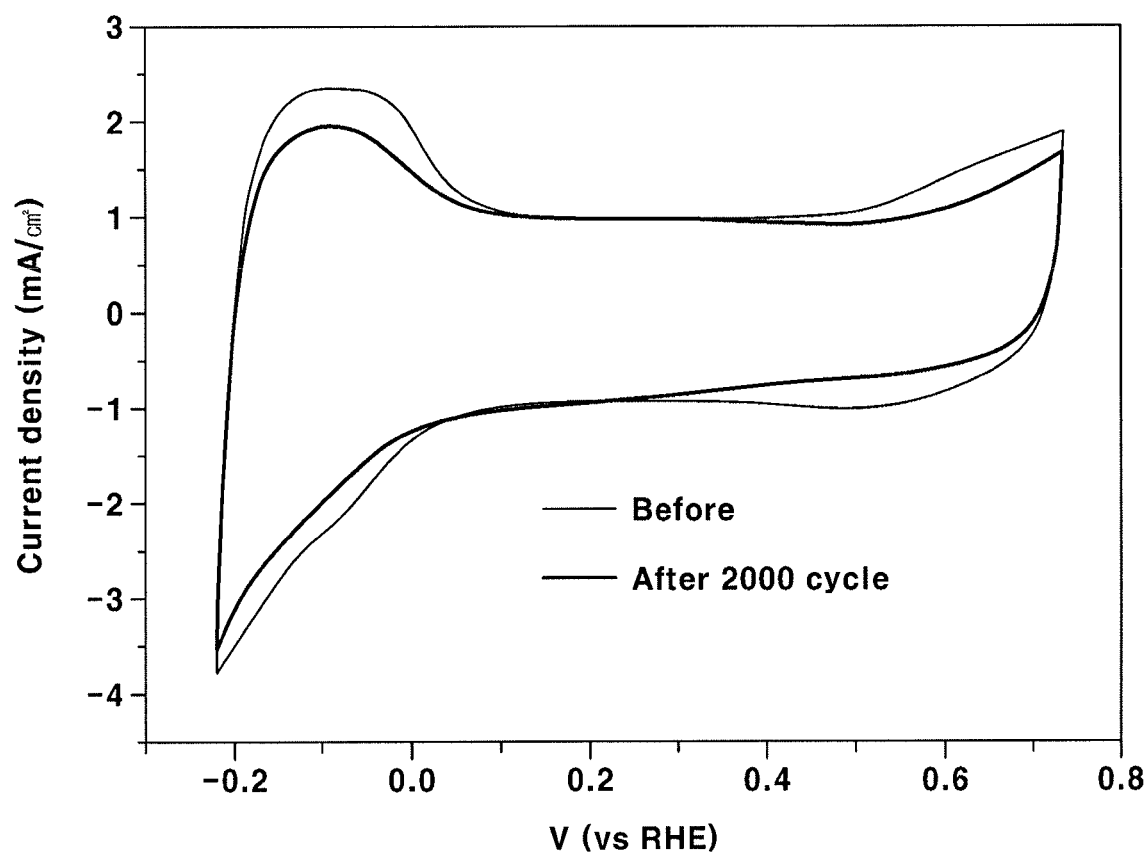
FIG. 9A is a graph showing a decrease in an electrochemically active area before and after a durability test on a metal catalyst of Example 2 according to an exemplary embodiment of the present invention.
Figure 9B:
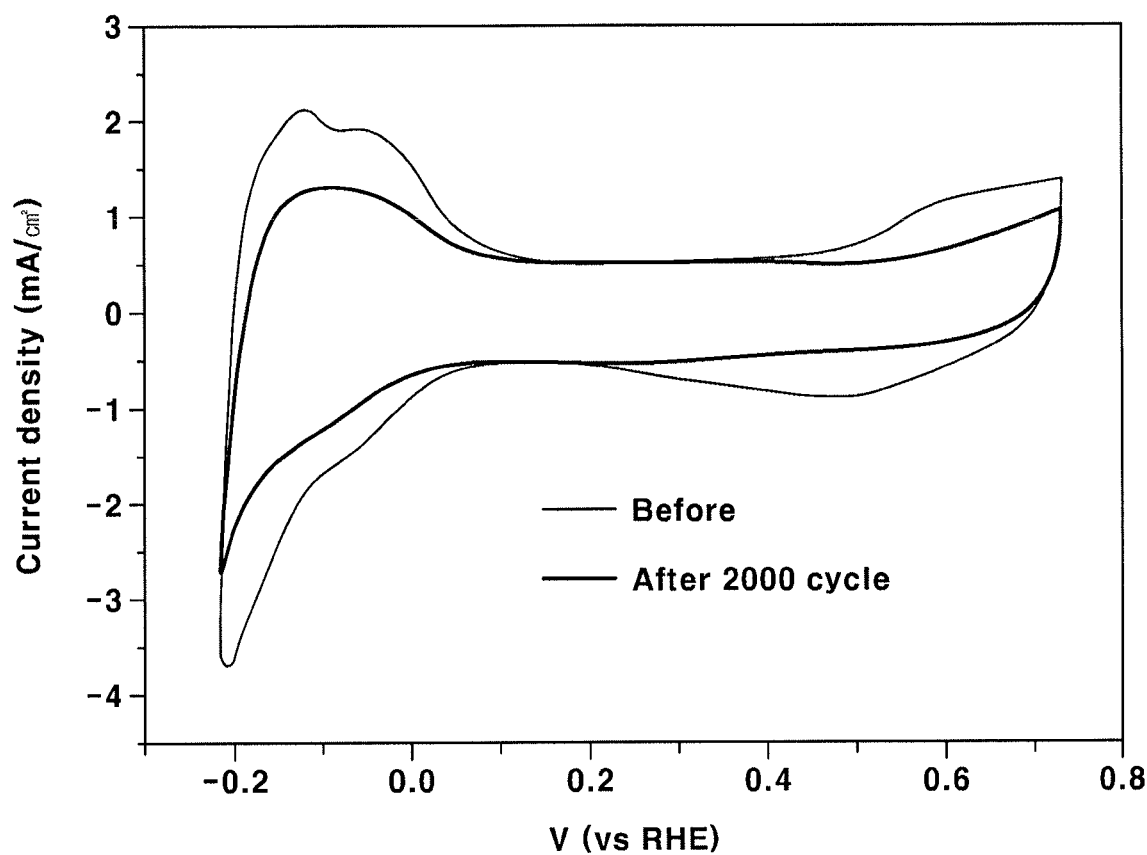
FIG. 9B is a graph showing a decrease in an electrochemically active area before and after a durability test on a commercially available platinum catalyst of Comparative Example 2.

The results are shown in FIGS. 9A and 9B and Table 1 below.

TABLE 1

| | Comparative Example 2 {20 wt % Pt/C (at 0.9 V)} | Example 2 {20 wt % Pt/TiN (at 0.9 V)} |
|---|---|---|
| ECSA before test (m²/g) | 53.01 | 48.72 |
| ECSA after 2000-cycle test (m²/g) | 25.48 | 29.21 |

* 125 cycles of activation from 0.15 V to 1.1 V at reversible hydrogen electrode (RHE).
* 4 cycles (inert gas atmosphere) from 0.05 V to 1.0 V at 0.05 V/s through cyclic voltammetry (CV).
* Scanning from 1.1 V to 0.0 V at 20 mV/s through linear sweep voltammetry (electrode rotating speed: 1600 rpm).
* 2000 cycles from 0.6 V to 1.0 V at 0.1 V/s at RHE (rotating speed: 1600 rpm)

As is apparent from FIGS. 9A and 9B and Table 1, the electrochemically active area before and after the durability test was decreased by 51.9% in the commercially available platinum catalyst of Comparative Example 2 and by 40.0% in the metal catalyst of Example 2. Therefore, it was confirmed that the metal catalyst of Example 2 was more stable than the commercially available platinum catalyst of Comparative Example 2 at the oxygen reduction potential.

Test Example 2.2

Comparison of Electrochemical Activity of Metal Catalyst

The extent of the decrease in the electrochemical activity of the metal catalyst manufactured in Example 2 of the present invention was compared with that of the commercially available platinum metal catalyst of Comparative Example 2.

Specifically, half-cell analysis was performed in order to compare the decrease in the electrochemically active area before and after the durability test. The specific half-cell analysis method was the same as in Test Example 2.1.

Figure 10A:
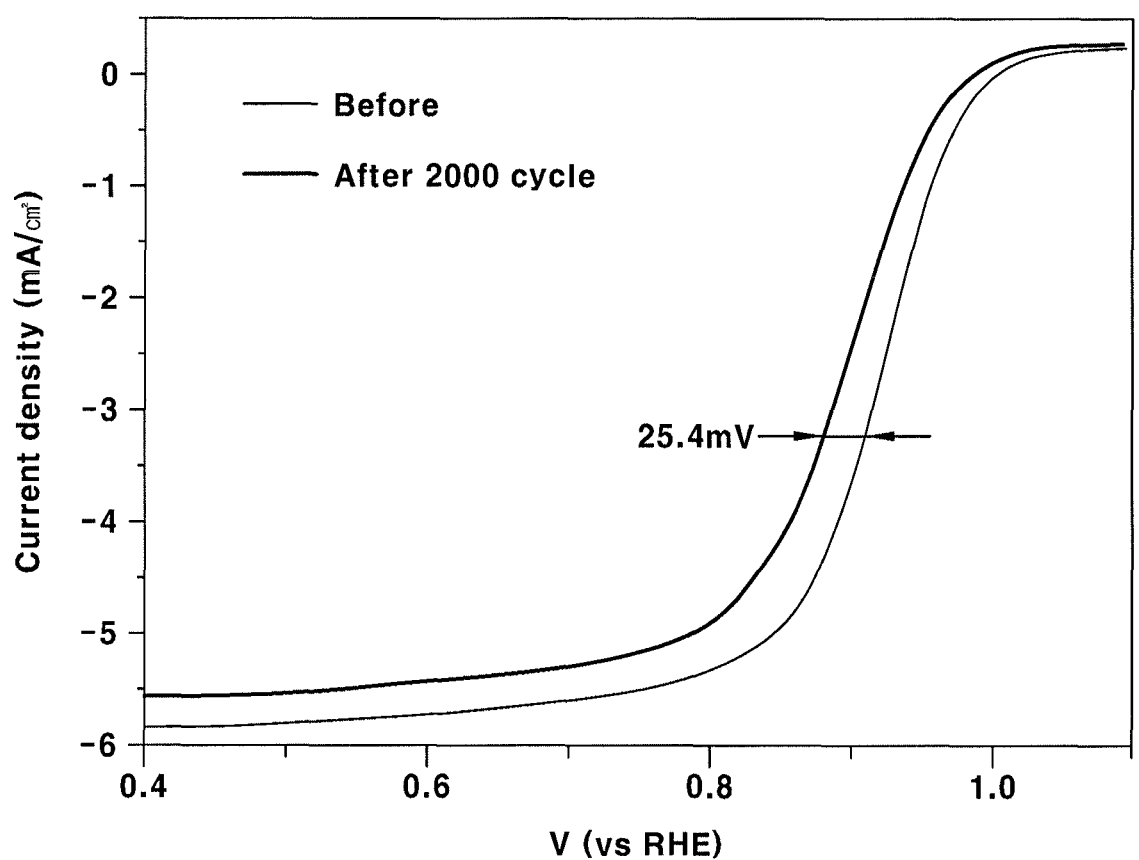
FIG. 10A is a graph showing a decrease in electrochemical activity before and after a durability test on the metal catalyst of Example 2 according to an exemplary embodiment of the present invention.
Figure 10B:
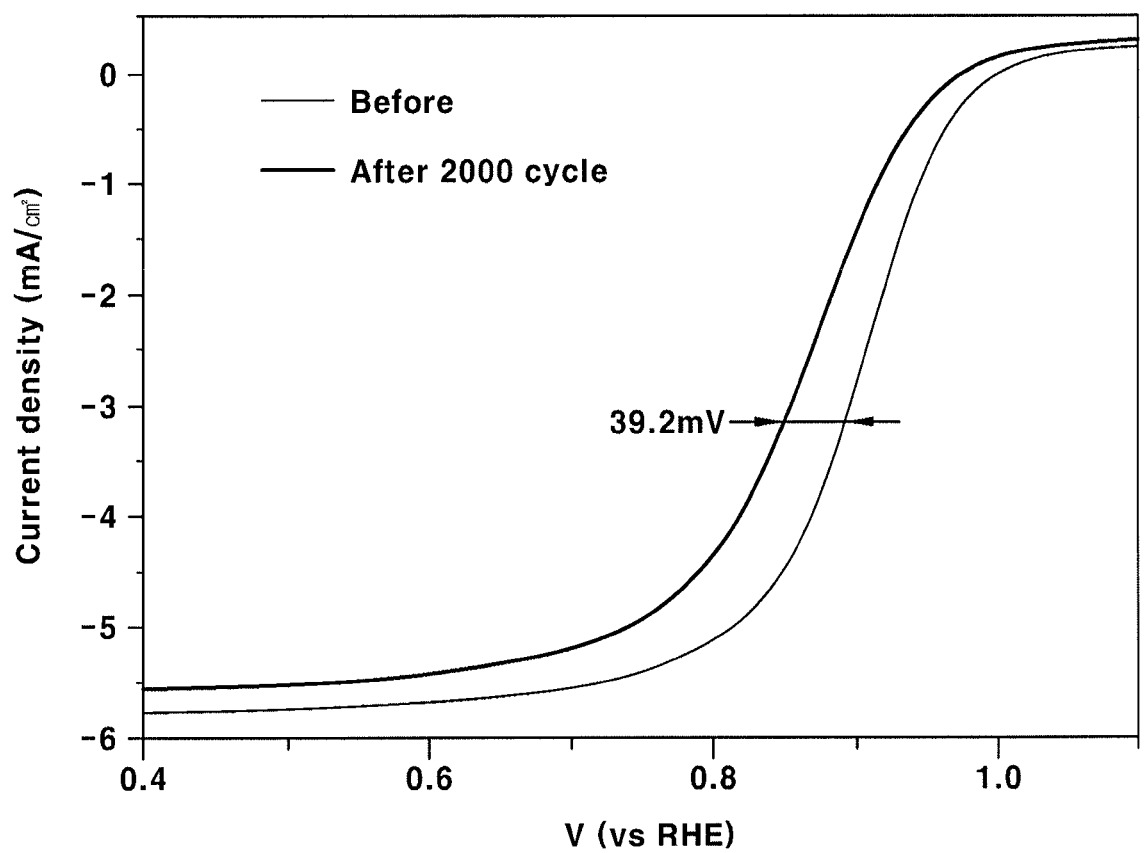
FIG. 10B is a graph showing a decrease in electrochemical activity before and after a durability test on the commercially available platinum catalyst of Comparative Example 2.

The results are shown in FIGS. 10A and 10B and Table 2 below.

TABLE 2

| | Comparative Example 2 {20 wt % Pt/C (at 0.9 V)} | Example 2 {20 wt % Pt/TiN (at 0.9 V)} |
|---|---|---|
| Activity before test (A/$mg_{Pt}$) | 0.107 | 0.181 |
| Activity after 2000-cycle test (A/$mg_{Pt}$) | 0.038 | 0.081 |

* 125 cycles of activation from 0.15 V to 1.1 V at reversible hydrogen electrode (RHE).
* 4 cycles (inert gas atmosphere) from 0.05 V to 1.0 V at 0.05 V/s through cyclic voltammetry (CV).
* Scanning from 1.1 V to 0.0 V at 20 mV/s through linear sweep voltammetry (electrode rotating speed: 1600 rpm).
* 2000 cycles from 0.6 V to 1.0 V at 0.1 V/s at RHE (rotating speed: 1600 rpm)

As is apparent from FIGS. 10A and 10B and Table 2, the decrease in the full width at half maximum was lower in the metal catalyst of Example 2 than in the commercially available platinum catalyst of Comparative Example 2. Also, the catalytic activity was about 1.7 times greater before the durability test and about 2 times greater after the durability test in the metal catalyst of Example 2 than in the commercially available platinum catalyst of Comparative Example 2. Furthermore, the electrochemically active area before and after the durability test at 0.9 V was decreased by 64.5% in the commercially available platinum catalyst of Comparative Example 2 and by 55.2% in the metal catalyst of Example 2. Therefore, it was also confirmed that the metal catalyst of Example 2 was more stable than the commercially available platinum catalyst of Comparative Example 2 at the oxygen reduction potential.

Test Example 3

Comparison of Electrochemical Activity of Platinum-Alloy Catalyst

The extent of the decrease in the electrochemical activity of the platinum-alloy catalyst manufactured in Example 3 of the present invention was compared with that of the commercially available platinum-alloy catalyst of Comparative Example 3.

Specifically, half-cell analysis was performed in order to compare the decrease in the electrochemically active area before and after the durability test. For specific half-cell analysis, 10 mg of each of the platinum-alloy catalyst manufactured in Example 3 and the commercially available platinum-alloy catalyst of Comparative Example 3 was mixed with 2 ml of a solvent (isopropyl alcohol:$H_2O$=3:1) and 5 µl of a Nafion solution (5 wt %) and dispersed through sonication for 5 min. Next, the solution was applied in an amount of 3 µl onto a polished glassy carbon electrode (5 mm in diameter) and then dried at room temperature. Next, the electrode was connected to a rotating disk electrode, after which electrochemistry was measured in an oxygen-saturated 0.1 M $HClO_4$ solution.

Figure 11A:
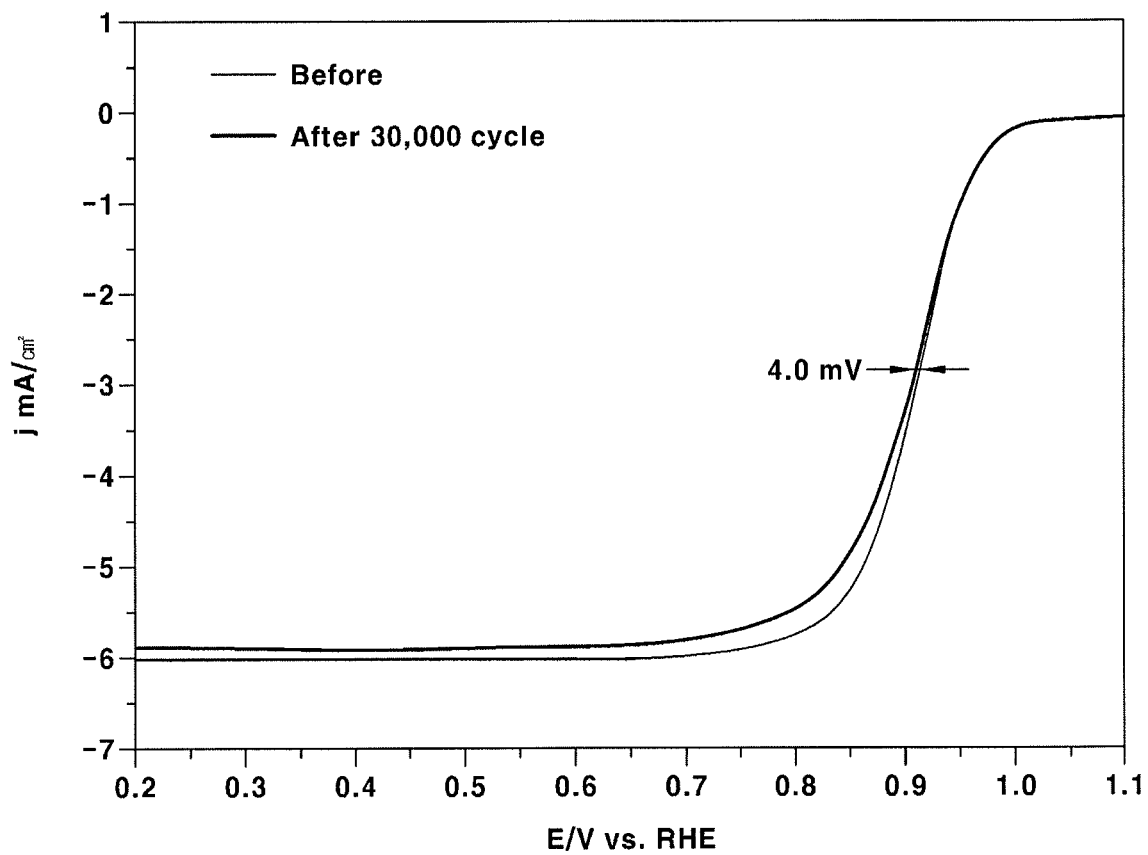
FIG. 11A is a graph showing a decrease in electrochemical activity before and after a durability test on a platinum-alloy catalyst of Example 3 according to an exemplary embodiment of the present invention.
Figure 11B:
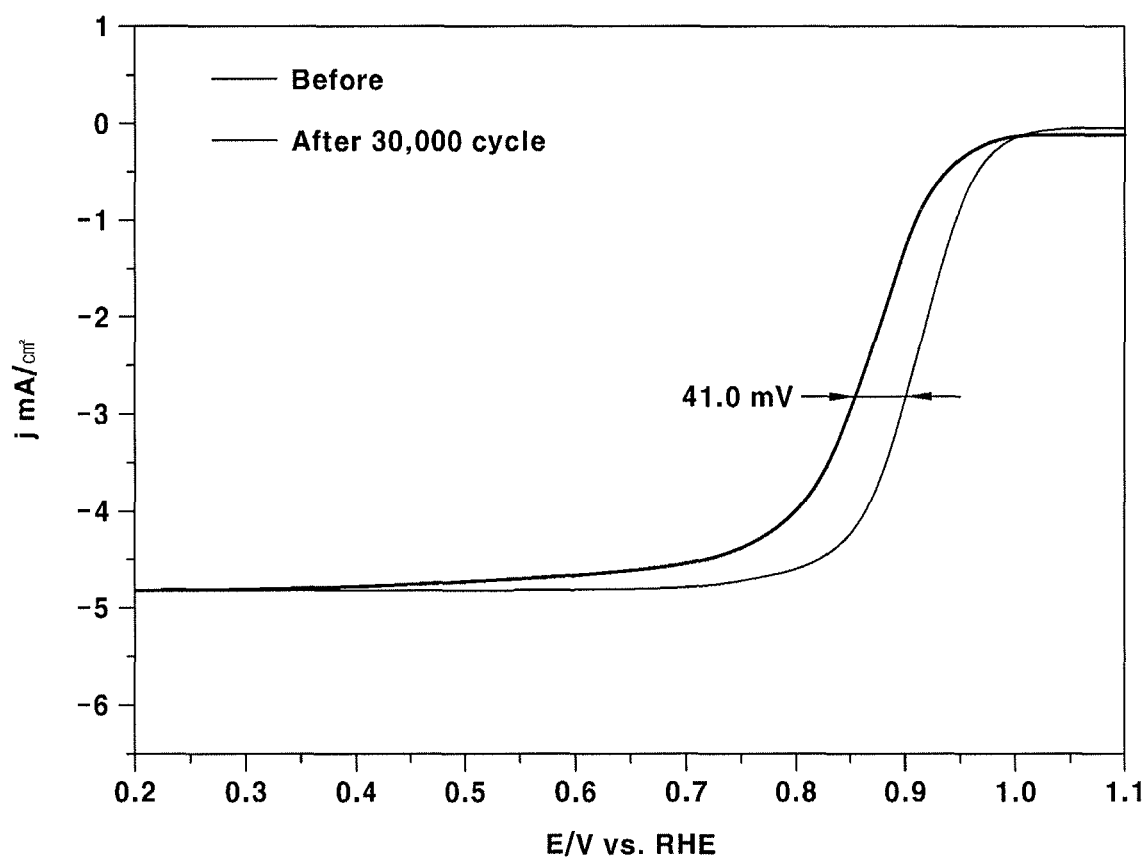
FIG. 11B is a graph showing a decrease in electrochemical activity before and after a durability test on a commercially available platinum-alloy catalyst of Comparative Example 3.

The results are shown in FIGS. 11A and 11B and Table 3 below.

TABLE 3

|  | Comparative Example 3 {40 wt % Pt/Tin (at 0.9 V)} | Example 3 {40 wt % Pt/Porous TiN (at 0.9 V)} |
|---|---|---|
| Activity before test (A/$mg_{Pt}$) | 0.35 | 0.425 |
| Activity after 2000-cycle test (A/$mg_{Pt}$) | 0.089 | 0.373 |

* 30,000 cycles of square waves from 0.6 V(3 s) to 0.95 V at reversible hydrogen electrode (RHE).
* 4 cycles (inert gas atmosphere) from 0.05 V to 1.0 V at 0.05 V/s through cyclic voltammetry (CV).
* Scanning from 1.1 V to 0.0 V at 20 mV/s through linear sweep voltammetry (electrode rotating speed: 1600 rpm).

As is apparent from FIGS. 11A and 11B and Table 3, the catalytic activity was about 1.2 times greater before the durability test and about 4 times greater after the durability test in the platinum-alloy catalyst of Example 3 than in the commercially available platinum-alloy catalyst of Comparative Example 3. Furthermore, the electrochemically active area before and after the durability test at 0.9 V was decreased by 74.6% in the commercially available platinum-alloy catalyst of Comparative Example 3 and by 12.2% in the platinum-alloy catalyst of Example 3. Therefore, it was also confirmed that the platinum-alloy catalyst of Example 3 was more stable than the commercially available platinum-alloy catalyst of Comparative Example 3 at the oxygen reduction potential.

Ultimately, it was concluded that the platinum-alloy catalyst according to the present invention was very stable at the oxygen reduction potential compared to the catalyst using platinum alone. When a polymer electrolyte battery is manufactured using the platinum-alloy catalyst, decreased use of expensive platinum and improved oxygen reduction performance can be expected.

Although the various exemplary embodiments of the present invention have been disclosed for illustrative purposes, those skilled in the art will appreciate that various modifications are possible without departing from the scope and spirit of the invention as disclosed in the accompanying claims, and such modifications should not be understood separately from the technical ideas or essential characteristics of the present invention.

What is claimed is:

1. A method of manufacturing a transition metal support, comprising:
   preparing an amphiphilic block copolymer;
   preparing a transition metal precursor;
   forming an admixture comprising the amphiphilic block copolymer and the transition metal precursor;
   evaporating the admixture;
   heat-treating the evaporated admixture to obtain a transition metal oxide;
   treating the transition metal oxide with a nitrogen precursor; and
   heat-treating the transition metal oxide treated with the nitrogen precursor,
   wherein the admixture is manufactured by:
   mixing the amphiphilic block copolymer and the transition metal precursor,
   supplying an acid solution, and
   performing stirring.

2. The method of claim 1, wherein the preparing the amphiphilic block copolymer comprises:
   preparing a methoxy polyethylene oxide (MeO-PEO) macro-initiator; and
   supplying styrene to the MeO-PEO macro-initiator.

3. The method of claim 1, wherein the amphiphilic block copolymer comprises poly(ethylene oxide)-b-polystyrene (PEO-b-PS).

4. The method of claim 1, wherein the transition metal precursor comprises one or more selected from the group consisting of titanium isopropoxide (TTIP), titanium chloride, niobium ethoxide, niobium chloride, and tungsten chloride.

5. The method of claim 1, wherein the evaporating the admixture is performed at a temperature of about 35 to 50° C.

6. The method of claim 1, wherein the heat-treating the evaporated admixture is performed in a manner in which the evaporated admixture is treated at a temperature of 90 to 110° C., a temperature of the admixture is elevated to a temperature of about 440 to 460° C. from a temperature of about 20 to 30° C. at a heating rate of about 1 to 5° C./min in an oxygen atmosphere, and then heat treatment is carried out for about 1 to 3 hr at the elevated temperature.

7. The method of claim 1, wherein the nitrogen precursor comprises cyanamide, ammonia ($NH_3$) or combinations thereof.

8. The method of claim 1, wherein the heat-treating the transition metal oxide treated with the nitrogen precursor is performed in a manner in which a temperature of the transition metal oxide treated with the nitrogen precursor is elevated to a temperature of about 790 to 810° C. from a temperature of about 25 to 30° C. at a heating rate of about 1 to 5° C./min in an inert gas atmosphere and then heat treatment is carried out for about 2 to 4 hr at the elevated temperature.

9. A transition metal support manufactured by a method of claim 1, wherein the transition metal support comprises one or more selected from the group consisting of titanium nitride (TiN), niobium nitride (NbN), and tungsten nitride (WN).

10. The transition metal support of claim 9, wherein the transition metal support comprises pores having a size of about 30 to 50 nm.

11. A method of manufacturing a metal catalyst, comprising:
dispersing a transition metal support manufactured by a method of claim 1;
preparing a metal catalyst solution;
manufacturing an admixture comprising the metal catalyst solution and the dispersed transition metal support;
heat-treating the admixture;
stirring the heat-treated admixture; and
additionally heat-treating the stirred admixture.

12. The method of claim 11, wherein the heat-treating is performed for about 2 to 4 hr in an inert gas atmosphere at a heating rate of about 0.5 to 1.5° C./min from a temperature of about 25° C. to about 170° C.

13. The method of claim 11, wherein the additional heat-treating is performed for about 0.5 to 1.5 hr in a hydrogen gas atmosphere at a heating rate of about 0.5 to 1.5° C./min from a temperature of about 25° C. to about 210° C.

14. The method of claim 11, wherein the metal catalyst solution comprises platinum (Pt).

15. A metal catalyst manufactured by a method of claim 11, wherein the metal catalyst comprises a platinum (Pt) catalyst.

16. A method of manufacturing a platinum-alloy catalyst, comprising:
preparing a transition metal support manufactured by a method of claim 1;
preparing an admixture comprising the transition metal support, platinum (Pt), and a metal precursor;
dispersing the admixture; and
heat-treating the dispersed admixture.

17. The method of claim 16, wherein the heat-treating is performed at a temperature of about 240 to 260° C. for about 1 to 3 hr in a hydrogen gas atmosphere.

18. The method of claim 16, wherein the metal precursor comprises one or more selected from the group consisting of manganese (Mn), iron (Fe), cobalt (Co), nickel (Ni), and copper (Cu).

19. A platinum-alloy catalyst manufactured by a method of claim 16, wherein the platinum-alloy catalyst comprises one or more selected from the group consisting of $PtMn_x$, $PtFe_x$, $PtCo_x$, $PtNi_x$, $PtCu_x$, wherein x is $0.1 \leq x \leq 3$.

* * * * *